United States Patent
Vicente

(10) Patent No.: US 8,954,562 B2
(45) Date of Patent: Feb. 10, 2015

(54) ENTROPY-BASED (SELF-ORGANIZING) STABILITY MANAGEMENT

(75) Inventor: John Vicente, Roseville, CA (US)

(73) Assignee: Intel Corporation, Santa Clara, CA (US)

( * ) Notice: Subject to any disclaimer, the term of this patent is extended or adjusted under 35 U.S.C. 154(b) by 1286 days.

(21) Appl. No.: 11/864,797

(22) Filed: Sep. 28, 2007

(65) Prior Publication Data

US 2009/0089410 A1 Apr. 2, 2009

(51) Int. Cl.
*G06F 15/173* (2006.01)
*H04L 12/28* (2006.01)
*H04L 12/24* (2006.01)
*G06F 9/455* (2006.01)

(52) U.S. Cl.
CPC .......... *H04L 41/142* (2013.01); *G06F 9/45533* (2013.01); *H04L 41/046* (2013.01); *H04L 41/06* (2013.01)
USPC ............................ 709/224; 709/223; 370/254

(58) Field of Classification Search
CPC ..... H04L 41/142; H04L 41/046; H04L 41/06; G06F 9/45533
USPC .................................. 709/223, 224; 370/254
See application file for complete search history.

(56) References Cited

U.S. PATENT DOCUMENTS

| | | | |
|---|---|---|---|
| 5,727,051 A * | 3/1998 | Holender | 379/112.05 |
| 5,819,033 A * | 10/1998 | Caccavale | 709/224 |
| 5,850,592 A * | 12/1998 | Ramanathan | 455/7 |
| 6,266,694 B1 * | 7/2001 | Duguay et al. | 709/223 |
| 6,519,660 B1 * | 2/2003 | Rooney | 710/38 |
| 6,711,409 B1 * | 3/2004 | Zavgren et al. | 455/445 |
| 6,788,650 B2 | 9/2004 | Chen et al. | |
| 6,829,222 B2 * | 12/2004 | Amis et al. | 370/238 |
| 6,928,475 B2 * | 8/2005 | Schenkel et al. | 709/224 |
| 6,986,137 B1 * | 1/2006 | King et al. | 718/104 |
| 7,039,694 B2 * | 5/2006 | Kampe et al. | 709/222 |
| 7,203,729 B2 * | 4/2007 | Chen et al. | 709/209 |
| 7,277,400 B2 * | 10/2007 | Ho et al. | 370/252 |
| 7,461,130 B1 * | 12/2008 | AbdelAziz et al. | 709/208 |

(Continued)

FOREIGN PATENT DOCUMENTS

| | | | | |
|---|---|---|---|---|
| CN | 1863130 A | * | 11/2006 | H04L 12/46 |
| GB | 2386287 A | | 9/2003 | |

(Continued)

OTHER PUBLICATIONS

Robinson, K.; Turgut, D.; Chatterjee, M., "An Entropy-based Clustering in Mobile Ad hoc Networks," Networking, Sensing and Control, 2006. ICNSC '06. Proceedings of the 2006 IEEE International Conference on , vol., No., pp. 1,5, 2006. <URL:http://ieeexplore.ieee.org/stamp/stamp.jsp?tp=&arnumber=1673108&isnumber=35110>.*

(Continued)

*Primary Examiner* — Rupal Dharia
*Assistant Examiner* — Wing Ma
(74) *Attorney, Agent, or Firm* — Trop, Pruner & Hu, P.C.

(57) ABSTRACT

In some embodiments, the invention involves calculating entropy-based stability values to be used in a framework to build a new class of network control (policy) and (state) management services. The framework may be used to build a number of self-management services to support decentralized (mesh) networks. Other embodiments are described and claimed.

27 Claims, 9 Drawing Sheets

(56) References Cited

U.S. PATENT DOCUMENTS

| | | | |
|---|---|---|---|
| 7,975,035 B2* | 7/2011 | Popescu et al. | 709/223 |
| 2002/0018448 A1 | 2/2002 | Amis et al. | |
| 2003/0009511 A1* | 1/2003 | Giotta et al. | 709/201 |
| 2003/0041150 A1* | 2/2003 | Passman et al. | 709/227 |
| 2003/0117966 A1 | 6/2003 | Chen | |
| 2003/0147400 A1* | 8/2003 | Devi | 370/395.21 |
| 2003/0172161 A1* | 9/2003 | Rymon | 709/226 |
| 2003/0202468 A1 | 10/2003 | Cain et al. | |
| 2004/0003111 A1* | 1/2004 | Maeda et al. | 709/237 |
| 2004/0100917 A1 | 5/2004 | Perkins et al. | |
| 2004/0157557 A1* | 8/2004 | Barnett et al. | 455/41.2 |
| 2005/0114429 A1* | 5/2005 | Caccavale | 709/200 |
| 2005/0152305 A1 | 7/2005 | Ji et al. | |
| 2006/0165012 A1 | 7/2006 | Habetha | |
| 2006/0268791 A1 | 11/2006 | Cheng et al. | |
| 2007/0079223 A1* | 4/2007 | Mondin et al. | 714/780 |
| 2007/0159999 A1 | 7/2007 | Twitchell, Jr. | |
| 2007/0260723 A1* | 11/2007 | Cohen et al. | 709/223 |
| 2007/0298821 A1* | 12/2007 | Bush | 455/507 |
| 2008/0013566 A1 | 1/2008 | Smith et al. | |
| 2008/0059631 A1* | 3/2008 | Bergstrom et al. | 709/224 |
| 2008/0082197 A1* | 4/2008 | Lacaille | 700/121 |
| 2008/0101313 A1 | 5/2008 | Choi et al. | |
| 2008/0253327 A1 | 10/2008 | Kohvakka et al. | |
| 2008/0313280 A1 | 12/2008 | Faisman et al. | |
| 2009/0024549 A1* | 1/2009 | Johnson | 706/46 |
| 2009/0083390 A1* | 3/2009 | Abu-Ghazaleh et al. | 709/209 |
| 2010/0042668 A1* | 2/2010 | Liang et al. | 709/201 |
| 2010/0071061 A1* | 3/2010 | Crovella et al. | 726/23 |
| 2010/0142409 A1* | 6/2010 | Fallon et al. | 370/255 |

FOREIGN PATENT DOCUMENTS

| | | | | |
|---|---|---|---|---|
| WO | WO 98/59462 | * | 12/1998 | H04L 12/24 |
| WO | WO 01/82678 A2 | * | 11/2001 | |

OTHER PUBLICATIONS

Beongku An and Symeon Papavassiliou,An Entropy-Based Model for Supporting and Evaluating Route Stability in Mobile Ad hoc Wireless Networks, IEEE Communications Letters, vol. 6, No. 8, Aug. 2002.

Office Action Received for European Patent Application No. 08253153.4, mailed on Jun. 15, 2009, 4 pages.

Office Action received for European Patent Application No. 08253154.2, mailed on Jun. 17, 2009, 5 pages.

European Search Report for European Patent Application No. 08253154.2 mailed Mar. 30, 2009, 8 pages.

"Shiner, J.S., et al. ""Simple Measure for Complexity."" Physical Review E, (StatisticalL Physics,Plasmas, Fluids, and RelatedInterdisciplinary Topics) APS through AIPUSA, vol. 59, No. 2, Feb. 1999".

European Search Report for European Patent Application No. 08253153.4 mailed Mar. 30, 2009, 8 pages.

Office Action received for U.S. Appl. No. 11/864,805 mailed May 24, 2010, 17 pages.

Office Action received for U.S. Appl. No. 11/864,805 mailed Dec. 7, 2009, 16 pages.

The State Intellectual Property Office of the People's Republic of China, Notice on the First Office Action, dispatched on Dec. 2, 2010 in Chinese application No. 200810168866.8.

European Patent Office, Office Action mailed Nov. 18, 2011 in European application No. 11 005 151.3-2416.

Kawai et al., "A Proposal of Improved FLAMA Protocol Reducing the Load of Sensor Nodes with Low Battery Power in Wireless Sensor Networks", Technical Research Report of The Institute of Electronics, Information and Communication Engineers (IEICE), IEICE, vol. 105, No. 627, NS2005-210, Feb. 23, 2006, pp. 209-212 (with English abstract).

Office Action Received for Japanese Patent Application No. 2008-246561, mailed on Nov. 16, 2010, 6 pages including English translation.

State Intellectual Property Office, P.R. China, Second Office Action issued Sep. 22, 2011 in Chinese application No. 200810178555.X.

State Intellectual Property Office, P.R. China, First Office Action mailed Mar. 24, 2011 in Chinese application No. 200110178555.X.

Japanese Patent Office, Final Notice of Reasons for Rejection mailed Apr. 19, 2011 in Japanese application No. 2008-246561.

\* cited by examiner

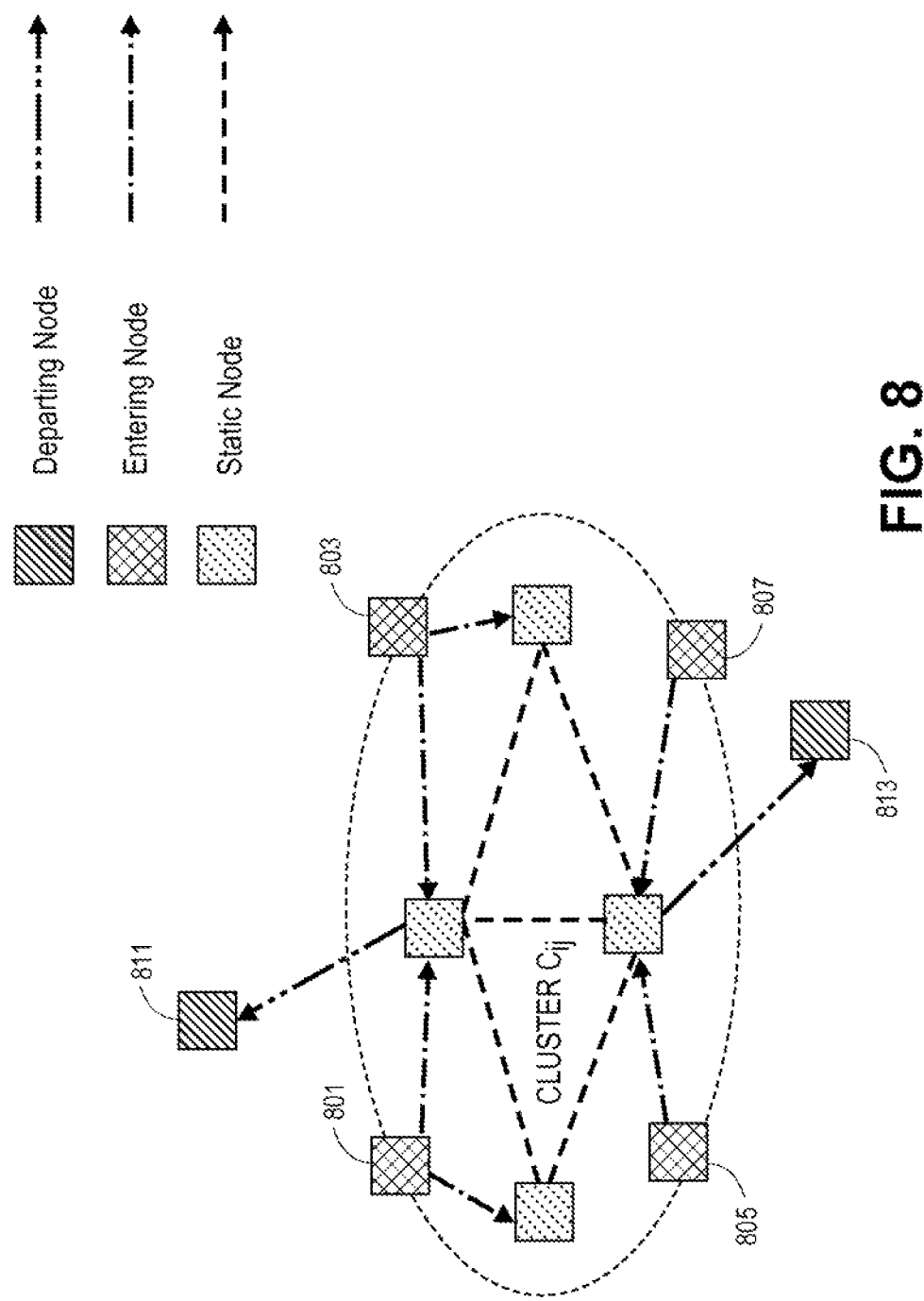

US 8,954,562 B2

ENTROPY-BASED (SELF-ORGANIZING) STABILITY MANAGEMENT

CROSS-REFERENCE TO RELATED APPLICATION

This application is related to application Ser. No. 11/864,805, entitled "VIRTUAL CLUSTERING FOR SCALABLE NETWORK CONTROL AND MANAGEMENT," filed concurrently, herein, by John Vicente.

FIELD OF THE INVENTION

An embodiment of the present invention relates generally to complex computer networks and, more specifically, to self-organizing nodes into clusters in the network for control and management of the network.

BACKGROUND INFORMATION

Various mechanisms exist for managing complex networks. Two widely used techniques used for network control and management are centralized management and decentralized, or distributed, management mechanisms. When looking at the problem of control and management of complex networks, control is are often associated with policy or configuration management associated with state assessment or state characterization. A number of network management tools exist today and are used in a variety of complex networks. Many tools are based on a concept of a centralized system where there is usually a centralized authority and administrators. Clients come into the central system based on a state or policy decision by the centralized authority.

Decentralized networks are also used, for instance, in a peer-to-peer model. However, most network management systems are based on a centralized model. There are two sides to network management and control. An autonomic system often refers to a control system model where on one side the state of the system is determined and on the other side the system is controlled through some sort of policy or configuration. When a system is autonomic, the loop is closed, in a sense. Thus, there is a state side and a control side. Typically network management systems are centralized or decentralized.

There have been problems with both the centralized and decentralized model networks, as implemented today. For instance, the centralized model does not scale well to very large complex systems. In decentralized networks, for instance, peer-to-peer and mesh networks, nodes, or client systems, may operate independent to infrastructure servers or infrastructure routers. A fairly complex environment often results, with respect to control and management.

Other problems in managing large systems relate to identifying criteria that define the stability, performance efficiency, robustness, and other operational metrics of system. Operational properties of the system may be collected and analyzed so a designer or administrator can reorganize the system for optimal performance and efficiency.

BRIEF DESCRIPTION OF THE DRAWINGS

The features and advantages of the present invention will become apparent from following detailed description of the present invention in which:

FIG. 8 depicts a cluster hierarchy where OverMesh nodes are entering the environment and departing the environment, according to embodiments of the invention;

DETAILED DESCRIPTION

Figure 1:
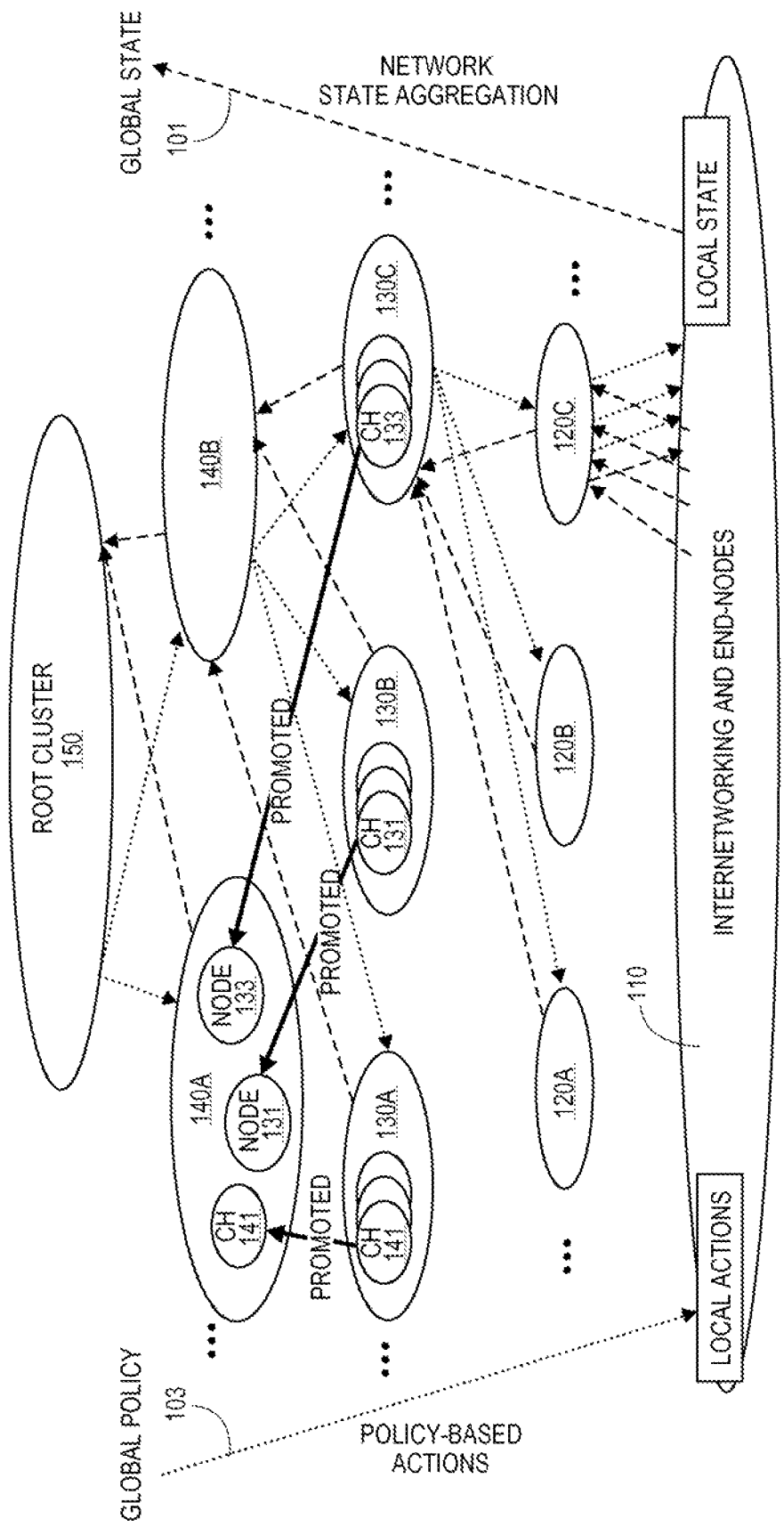
FIG. 1 is a block diagram illustrating clusters formed and aggregated at multiple levels of a logical hierarchy, according to an embodiment of the invention.

In mesh networking, state fluctuations may occur due to any number of changes occurring at a local (OverMesh) node or network-wide level. Unlike traditional hierarchical networks, where topology, traffic control or networking nodes have a more centralized configuration or static functional structure, the representation of these same concepts in mesh networking is much more dynamic, loosely structured and decentralized—creating a more chaotic environment for network control and management. Embodiments of the invention are directed to self-organizing networks, such as that disclosed in related application Ser. No. 11/864,805, entitled "VIRTUAL CLUSTERING FOR SCALABLE NETWORK CONTROL AND MANAGEMENT," filed concurrently, herein, by John Vicente.

In the self-organizing approach, one must address these issues without human dependency, address the complexity through an organized clustering framework, and manage the uncertainty through statistical computing methods with learning and distributed knowledge build-up.

One critical aspect of uncertainty is the notion of network stability; thus, it is critical to be able to recognize and capture the level of stability or instability in the mesh networking system. Understanding where there are reliable and available network services, nodes or topological areas for network delivery and communications is essential to scaling the system. Hence, an aspect of a self-organizing network is the development of a cluster-based capability that continuously manages network availability or reliability for stability assessment. Embodiments of the invention disclose herein build on the application of entropy formulations used in several works in other subject areas. In embodiments of the invention, entropy formulations are used to characterize the level of uncertainty or diversity exhibited by respective clusters in the mesh networking environment. More specifically, entropy evaluation is performed real-time for each cluster with further aggregation as the self-organizing process progresses up the cluster hierarchy, or the broader network. Thus, the areas of the network that have achieved a level of stability would have higher entropy and thus, can enable for more reliable service delivery or network control.

An embodiment of the present invention is a system and method relating to applying entropy-based, self-organizing stability management in complex systems. The calculated stability metrics may be used in the self-promotion and demotion activities in a self-organizing network, for instance virtual clustering for control and management, as well as in a variety of other applications.

Reference in the specification to "one embodiment" or "an embodiment" of the present invention means that a particular feature, structure or characteristic described in connection with the embodiment is included in at least one embodiment of the present invention. Thus, the appearances of the phrase "in one embodiment" appearing in various places throughout the specification are not necessarily all referring to the same embodiment.

For purposes of explanation, specific configurations and details are set forth in order to provide a thorough understanding of the present invention. However, it will be apparent to one of ordinary skill in the art that embodiments of the present invention may be practiced without the specific details presented herein. Furthermore, well-known features may be omitted or simplified in order not to obscure the present invention. Various examples may be given throughout this description. These are merely descriptions of specific embodiments of the invention. The scope of the invention is not limited to the examples given.

Embodiments of the present invention may be applied to decentralized networks, such as mesh networks or peer-to-peer networks. Because of the complexity of these types of networks, a new approach for control and management is required. Embodiments of the invention, solve some of the management problems of existing large decentralized networks by utilizing merits of both the centralized and decentralized models. A discussion of a self-organizing network will be discussed below so that the context of embodiments of the present invention may be better understood. It should be noted that embodiments of entropy-based stability management may be used in other applications, as well.

The concept of clusters has been used before in peer-to-peer, sensor based, and wireless mesh networks. A sensor network uses small devices, for instance, body sensors, environmental sensors, facility sensors, etc. to gather information and provide the information to a centralize location for analysis. A wireless mesh network typically does not use an infrastructure for communication. In a wireless mess network, a variety of client devices just communicate with each other in a peered fashion. Thus, when a device is off the network, the other network devices may still communicate with one another. A peer-to-peer network is not based on communication peering, but based oil computing peering. However, embodiments of the present invention improve upon these models melding aspects of both centralized and decentralized framework using both centralized control and decentralized control along with centralized state management and decentralized state management. In embodiments, self-promotion and autonomic promotions and reorganization of the cluster hierarchy are utilized.

Embodiments of the present invention utilize stability management in concert with a virtual clustering approach to traditional network control and management. This is a hybrid model of centralized and decentralized management and control. Clusters may be formed and aggregated at multiple levels of a logical hierarchy, as shown in FIG. 1. As depicted, the physical network nodes 10 are at the bottom of the hierarchy and do not (on a physical level) participate in the clustering schematic. The nodes in the physical network layer 110 may be seen as decentralized nodes. At this layer 110, the nodes are peered, with no centralized system or control.

The arrow 101 on the right represents states or network management states. Behavior is occurring in the network and the states of the nodes rises and aggregates up through clusters of nodes. The arrow 103 on the left represents policy. For instance, if the system is operating inefficiently, policies are enforced down to the nodes from cluster-heads at a higher level, in order to control the system to make cause it to operate more efficiently. Autonomic systems often use this representation as illustration, e.g., state and control. In effect, there is a sensing side 101 and an actuation side 103.

Network providers build hierarchical systems. However, these systems are physically hierarchical. Thus, once the system is built and statically defined, it stays at a status quo until a human physically makes a change to the network, for instance, adding a node or device. Communication systems and computing systems are often built on a physical hierarchical framework. They are physically oriented. In decentralized systems, there is often a flux, but no control or authority. Further, clustering that is used today seems to be directed to transportation of data, rather than control and management of the network hierarchy.

Structure in the system may be created using a virtual model, rather than a physical model, specifically, using virtual clustering. Virtual clustering may be accomplished in multiple ways. Embodiments of the invention implement the virtual clusters using overlays or distributed virtual machines (DVMs). Clustering may be used to balance between the merits of decentralized management organizational strategy and a purely centralized organizational strategy. By organizing state management and control policies over hierarchies of clusters, merits of the peer-to-peer dynamics and more centralized dynamics may be achieved in a progression towards the root of the cluster 150 hierarchical tree.

Referring again to FIG. 1, an exemplary hierarchy of a network is shown with five (5) cluster levels: Cluster level 0 (root level) 150, Cluster level 1 (140a-b), Cluster level 2 (130a-c), Cluster level 3 (120a-c) and the physical network layer, Cluster level n=4 110. Each cluster level has a cluster-head. Each node within a cluster, also logically belongs to the clusters below as it is promoted upward. Even if a node has been promoted to a higher cluster, it still has functional responsibilities within the clusters below it. A cluster, for instance, 140a will comprise one leader (cluster-head 141) and leaders from the clusters below, for instance 131 and 133. Cluster-head 141 is also a cluster-head for cluster 130a below it in the hierarchy, as well as other lower level clusters (not shown). In this example, the cluster 140a comprises leaders from 130a, 130b and 130c (141, 131, and 133, respectively). The node that rises to leader of the root cluster would be the most operationally resilient node in the network. Each cluster comprises a subset of the nodes in the decentralized system 110, so the clusters are easier to control and optimize—there is less chaos. These concepts will be described more fully, below.

It should be noted that there is an independence property (emergence) associated with the cluster nodes, where each cluster level and cluster 'bubble' is autonomous and observes behavior to direct peer, parent and child clusters, but has no context of the multiple hierarchy, except for nodes promoted to multiple levels. For instance, cluster-head 141 may communicate with nodes in cluster 140a and 130a, but has no direct knowledge or control of cluster 140b. Cluster-head 141 also has no visibility into the root cluster 150, unless promoted into that cluster. It may be seen that node 141 is a cluster-head of both cluster 130*a* and 140*a*. Nodes 131 and 133 are cluster-heads of clusters 130*b* and 130*c*, respectively, by only peer nodes in cluster 140*b*, at the higher level, and subordinate to node 141.

Clusters are proxy'ed by the promoted cluster-head, and cluster-heads act on behalf of the cluster. The cluster-head is leading, participating in the depth (tree), breadth (level) and specific cluster they are leading. This reduces the level of complexity in node communications, as only the cluster-head needs to be involved in control and management communication outside of the cluster; the cluster-head represents the cluster, as if it were a single node.

Through this separation of state management and control policies, self-organizing properties may be introduced at each level of the hierarchy and such behaviors may be consolidated to respective clusters, albeit with policy and state influences from peered, parent (global) and child (local) clusters. Since, there exists multiple, logical levels or overlays of clustering, the higher level clusters and cluster-heads will be formed of underlying cluster-heads, not physical nodes. It should be noted that the cluster-head at the root level, and all underlying levels, is not tied to a specific physical node. The sensing of operational efficiencies triggers actuation and fluctuation of the nodes' promotion and demotion within the system. More resilient nodes rise and less resilient nodes will fall in the hierarchy.

The information required to cause the actuation of change based on the collected states is distributed among the nodes in the cluster, rather than residing in a single database under control of one central server. Not all of the nodes will have all of the information. Nodes receive relevant information. If a node n participates in a cluster C, then node n will have information relating to cluster C.

A Clustering Manager (CM) is a distributed overlay, or distributed virtual machine (DVM), service managing the depth and breadth of the cluster hierarchy. The CM may be distributed on a subset of nodes, however the ability to participate is afforded to all nodes. In general, trust and truthfulness are expected, but in the context of CM, the operational decisions are handled as one entity, not consensus, but by global state synchronization. Specific functions of cluster addressing, clustering operations and cluster-head selections are managed through the CM. The CM, is a lightweight service function that facilitates the entire life-cycle of the logical clustering hierarchy supporting the physical domain of network nodes. This life-cycle includes coordinating the grouping or regrouping of network nodes through cluster addressing facilitation, inter-cluster node (mobile) movement or the creation and breakdown of clusters, as needed. However, similar to common Internet services (e.g. DNS) the CM serves the control management functions primarily to coordinate the hierarchical organization of the clustering operations and management.

Cluster-Head Selection: Operational Superiority:

The selection of cluster-heads may be based on operational superiority or rank. Similar to military or corporate rank, the basis of higher ranked cluster-lead nodes is established by the ability of nodes to be highly networked, highly reliable, stable and superior performers. In other words, nodes which exhibit higher (a) reachability, (b) stability and (c) performance efficiency are to be promoted to cluster-heads. This self-organized positioning is not unlike the human organization of network nodes in a traditional hierarchical telecommunications network, where nodes at the core of the network must exhibit high availability (e.g., five nines), demonstrate high reachability capability and extremely low latency. Thus, it is expected that i.) reachability state, ii.) stability state, and iii.) performance state will be the quantitative ordering basis for determining operational rank and superiority.

Embodiments of the invention utilize an entropy-based, self-organizing stability management engine to evaluate levels of stability in the nodes and system. Usage of this entropy-base stability management provides a valuable measurement of a nodes stability which may then be used in promotion and demotion decisions. This form of stability management will be described more fully, below.

In an embodiment, a network may be initially created with virtual Clusters using some other, artificial criteria, such as highest address results in highest rank. The natural progression of using reachability, stability and performance efficiency to determine promotion and demotion will ultimately result in an optimized network, at least for these criteria. It is contemplated that other criteria may be used, or weighted differently for networks of different types.

In some embodiments, the system relies on truthfulness of the nodes. For instance, when a node declares itself superior, the other nodes will agree. In other embodiments, the system relies on nodes watching the performance of other nodes in the cluster. In this case, other nodes may offer to rank a node. Nodes are able to rank the reachability of other nodes.

As one progresses up the cluster hierarchy, temporal and spatial state aggregation will take place, changing the selection of higher-level cluster-heads, differentiating nodes with operational longevity and more abstract state management and policy control. To use the corporate or military analogy, the experienced or 'big picture' personnel are more likely to move up and operate at the higher ranks of leadership and change influence in an organization.

Further, there is no prohibition or rule against 1000 nodes promoting themselves into 1000 levels of clusters with one node each. However, in embodiments of the invention, this should not happen. A stable system may have many levels and be asymmetrical. It is contemplated that depending on the problem set to be solved by the network, various hierarchies or varying levels may emerge. For instance, for systems performing fault management, it may be that fewer levels are more efficient. Different strategies may be used for different management and control systems. It may be desirable for a large data center requiring the five nines of for up-time to be weighted more in the stability criteria for promotion. For a DNS server system, perhaps reachability will be more weighted for promotion. It is also contemplated that regardless of the weighting of the variables that clustering will naturally result. This type of clustering has been shown to be natural in statistical systems.

Cluster Identification:

In an embodiment, a single cluster addressing scheme exists across the cluster hierarchy. At the lowest level of the hierarchy (FIG. 1, 110), the physical network will be labeled as cluster level n, cluster $C(n,0)$, where $0<=n<y$, and y is the number of levels in the emergent hierarchy. For the purposes of this discussion, the lowest level of the tree does participate in the clustering management activities; however, for completeness, this network addressing is maintained and can be used, for example, for physical network service broadcasting purposes. As the networked nodes are virtually partitioned and clustered across cluster level n, the next level (up) will be cluster level n−1; and depending on the number clusters at level n−1, a n−1 level cluster is then assigned a cluster domain, m, where $0<=m<y$, and y equals the number clusters at this hierarchy level. In the example shown in FIG. 1, n=4, and for cluster level 2 (130*a-c*), m=3, because there are three clusters shown in this level. Thus, any cluster in the hierarchy will be labeled $C(n, m)$. Continuing along this progression, the eventual highest or root cluster is assigned C(0,0). The continued segregation of clusters level partitioning (and addressing) may not necessarily follow or reflect a symmetrical tree hierarchy; that is, each cluster level may converge to a number of clusters fewer than the number of clusters below its level, depending on the system dynamics of the environment. Furthermore, network nodes (at the lowest level n) or cluster-heads (at levels <n) assigned to a particular cluster will use C(n, m) to communicate with nodes (or cluster-heads) in this particular cluster, or specifically, the cluster-head assigned to manage the C(n, m).

Cluster nodes or cluster-heads associated with a parent cluster may use the cluster address for sinking and responding to cluster operational communications, but only the global cluster-head may utilize the cluster address for sourcing operational communications or clustering control or management. In summary, only global cluster-heads can participate in inter-cluster and intra-cluster communications and can directly influence the global behavior of the cluster, peers or child clusters. Other nodes or cluster-heads (associated to this global cluster) may influence indirectly, but only via their intra-cluster (local) participation as members of the global cluster.

The addressing scheme supports multicasting across cluster-heads, where C(n,–) communicates to all peer cluster-heads at level n. Furthermore, cluster-heads are the only nodes in a cluster that are aware of the hierarchy lineage, and therefore communicate via their lineage and peer cluster-heads; thus, they are not aware of the broader set of clusters outside their level and lineage. Alternatively, a cluster-head, which continues to operationally dominate in the emergent hierarchy up to, and assigned the root cluster C(0,0), does have the ability to communicate and possibly access state or policy across all clusters in the hierarchy. Thus, there is clear advantage and incentive for nodes to not only strive for operational superiority, but also to demonstrate their truthfulness with peers and subordinates to increase their positioning over their lifetime.

Inter-cluster and intra-cluster communications (i.e., cluster-specific control and management messaging) occur according to specific addresses assigned to cluster-heads as described above. It will be understood by those of skill in the art after reading this disclosure that an overlay structure for accomplishing cluster virtual networking may be based on any number of schemes. In general, messaging will appear peer-to-peer in the overlay; however logically, the operational messaging will support state and policy-based communications and will occur in intra-cluster, inter-cluster in hierarchical or peer form based on the clustering structure. Control (policy) and management (state) messages will be asynchronous and will support cooperative, aggregation and peering algorithms as discussed in the upcoming sections.

Clustering Operations:

As stated earlier, the objectives of the clusters are to facilitate network control and management through a balance of peer-to-peer and hierarchical organizational control. The state management functions may include stability, optimization and connectivity state management, for example. Cluster-head nodes receive cluster state conditions and perform aggregation and correlation within their respective clusters or cluster nodes (i.e., cluster-heads beyond level n). Cluster-heads perform cluster state analysis through statistical computing techniques, holding cluster knowledge for state-level assimilation with peer clusters. Cluster state is propagated upward to global cluster-heads, or acted upon though the integration of local and global policy using policy-based reinforcement to control or influence the local cluster behavior.

At each level of the clustered hierarchy, control and management behavior novelty is exhibited independently between cluster levels with both temporal and spatial (state, policy) aggregation occurring. The spatial aggregation represents or accounts for the multiple local clusters affiliated with the global cluster, while temporal aggregation accounts for the cycle periods that local clusters follow. Thus as cluster aggregation occurs, slower state changing effects can be seen in clusters at the higher end of the cluster hierarchy, mimicking behavior normally observed through experience in human knowledge or decision making in hierarchical organizations.

A long standing design choice in the information technology (IT) network control and management community is the level of centralized or decentralized control or management that may be designed into network management or policy-based management tools. While there are advantages and disadvantages to both architectural choices, embodiments of the present invention call for an entirely new approach based on a virtual clustering methodology, previously applied to peer-to-peer and sensor-based networking systems. Thus, clustering, as an architectural choice, is used to balance between the merits of decentralized organizational strategy and a purely centralized organizational strategy for both state management and policy-based management. (See FIG. 1). Organizing state management and control policies over hierarchies of clusters, of decentralized dynamics at the lower portion of the hierarchy and more centralized dynamics while progressing towards the root of the tree, enable the merits of a hybrid network to be achieved. Moreover, through this hierarchy and separation, the parent-to-child cluster separation properties are created at each level of the hierarchy and self-organizing behaviors may be consolidated to respective clusters, albeit with policy and state influences from peered, parent or child clusters. Furthermore, the overhead of distributed management and control are localized without compromising the benefits of global, distributed control and management. A cluster-head will act as a central function to facilitate central management within each, respective cluster.

Figure 2:
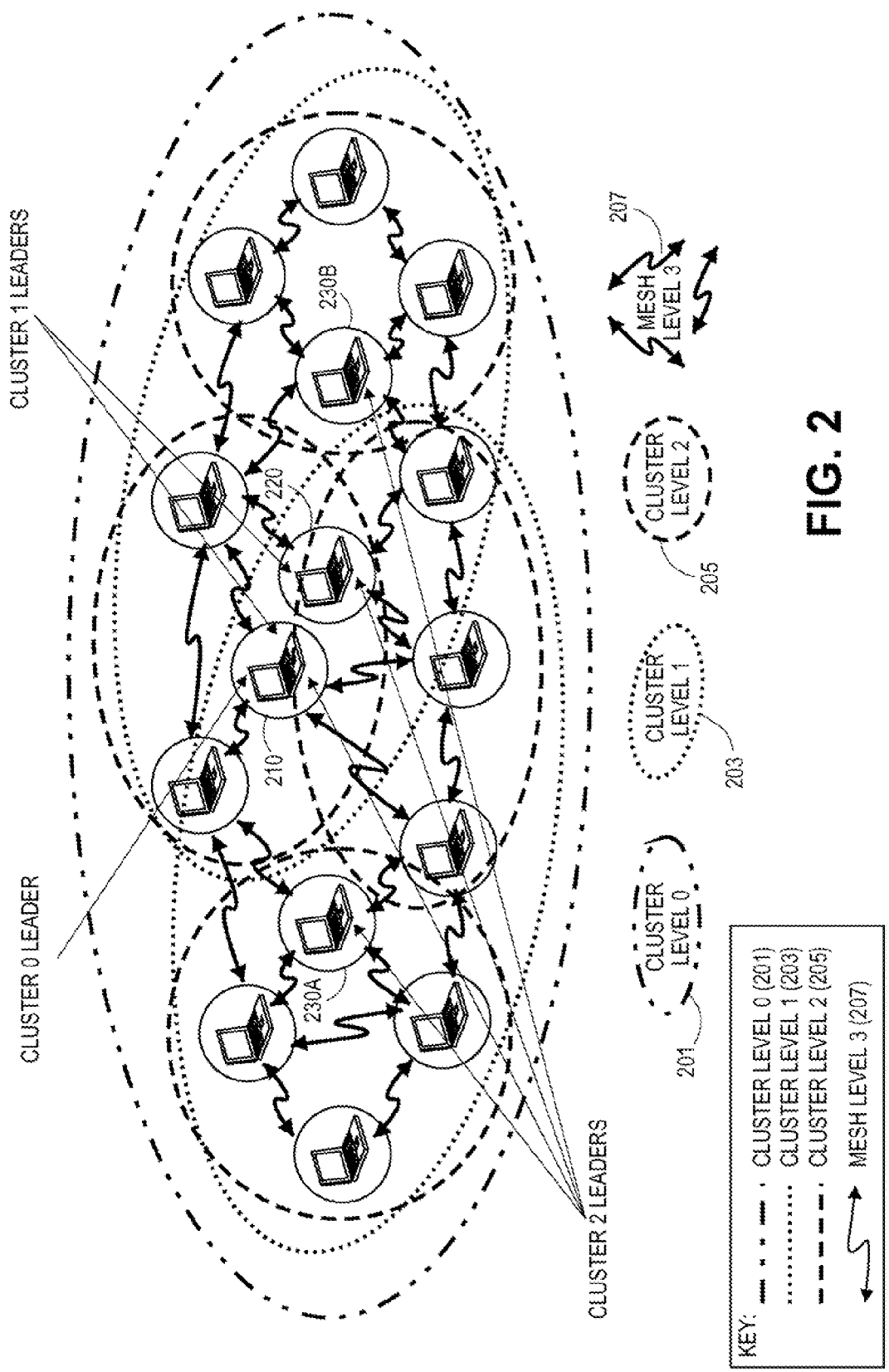
FIG. 2 is a block diagram illustrating an alternative representation of the hierarchical network, according to an embodiment of the invention.

Referring now to FIG. 2, there is shown another representation of the hierarchical network. This exemplary system is shown with four cluster levels, 0-3, where the level 3 cluster is the mesh network. Clusters of nodes in Cluster level 0 are surrounded by a broken line interspersed with two dots 201. Cluster level 1 is represented by a broken dotted line 203. Cluster level 2 is represented by a grey dashed line 205, and the mesh level 3 is represented by arrowed lightening bolts 207. The cluster heads, or leaders are shown. Cluster 0 leader 210 is also a leader of Cluster 1 (along with 220), and Cluster 2 (along with 230a, 220, and 230b).

In an alternative embodiment, a network designer may choose to use more criteria, e.g., in addition to reachability, stability and performance efficiency, or a subset thereof in order to effect self-promotion. Other combinations of factors may be optimal for some networks, or preferred for cost or maintenance reasons.

Figure 3:
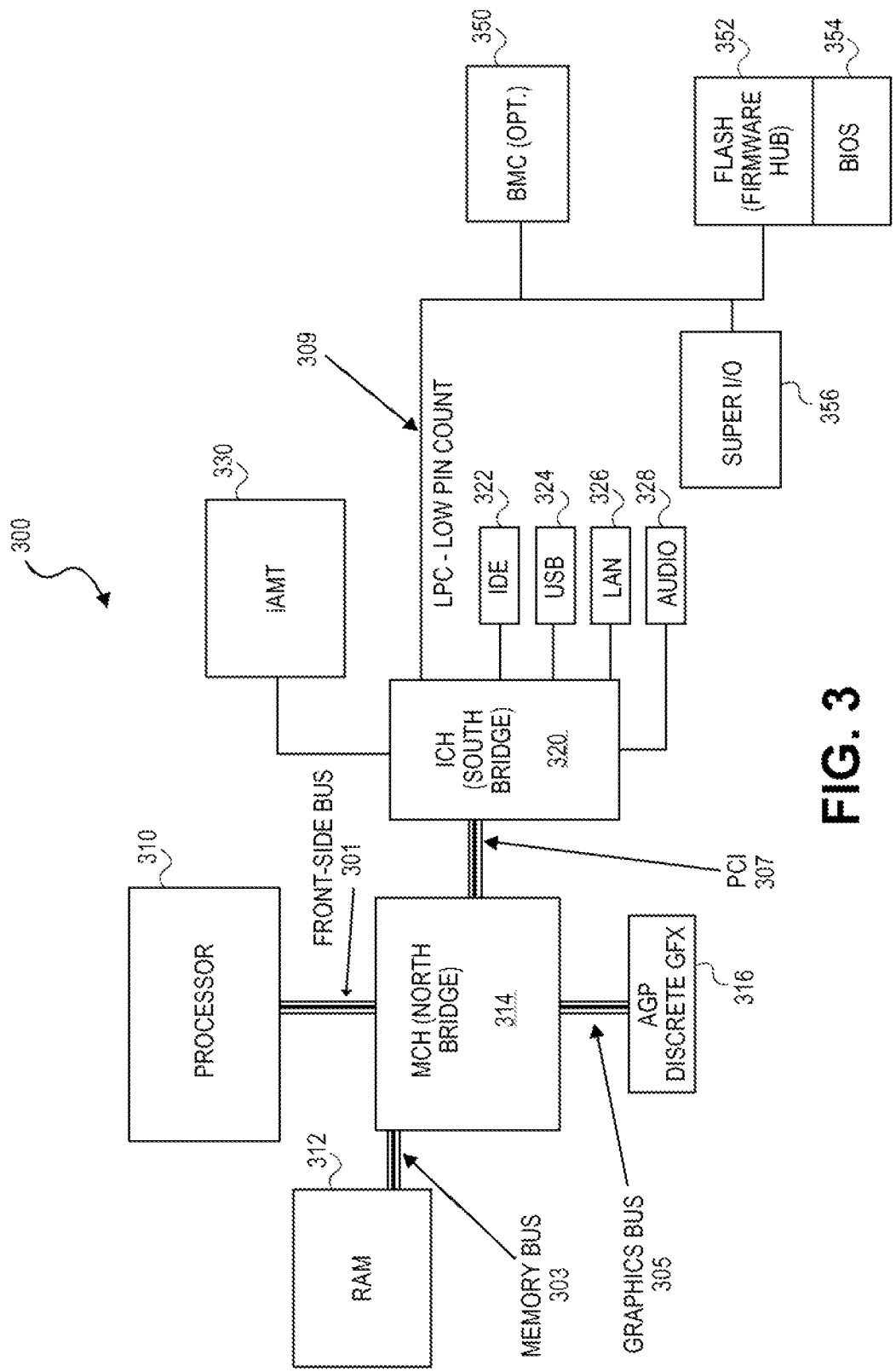
FIG. 3 is a block diagram of an exemplary node architecture, according to an embodiment of the invention.

FIG. 3 is a block diagram of an exemplary node architecture 300. Processor 310 communicates with a memory controller hub (MCH) 314, also known as North bridge, via the front side bus 301. The MCH 314 communicates with system memory 312 via a memory bus 303. The MCH 314 may also communicate with an advanced graphics port (AGP) 316 via a graphics bus 305. The MCH 314 communicates with an I/O controller hub (ICH) 320, also known as South bridge, via a peripheral component interconnect (PCI) bus 307. The MCH 320 may be coupled to one or more components such as PCI hard drives (not shown), legacy components such as IDE 322, USB 324, LAN 326 and Audio 328, and a Super I/O (SIO) controller 356 via a low pin count (LPC) bus 356.

Processor 310 may be any type of processor capable of executing software, such as a microprocessor, digital signal processor, microcontroller, or the like. Though FIG. 3 shows only one such processor 310, there may be one or more processors in platform hardware 300 and one or more of the processors may include multiple threads, multiple cores, or the like.

Memory 312 may be a hard disk, a floppy disk, random access memory (RAM), read only memory (ROM), flash memory, or any other type of medium readable by processor 310. Memory 312 may store instructions for performing the execution of method embodiments of the present invention.

Non-volatile memory, such as Flash memory 352, may be coupled to the IO controller via a low pin count (LPC) bus 309. The BIOS firmware 354 typically resides in the Flash memory 352 and boot up will execute instructions from the Flash, or firmware.

In some embodiments, platform 300 is a server enabling server management tasks. This platform embodiment may have a baseboard management controller (BMC) 350 coupled to the ICH 320 via the LPC 309. In other embodiments, platform 300 may have a microprocessor or "manageability engine" (ME) controller 330 coupled to the ICH 320. This ME controller 330 may be an Intel® Active Management Technology (iAMT) architecture. In some embodiments, the BMC 350 or the iAMT 330 may execute network services to determine the (a) reachability, (b) stability and (c) performance efficiency of the platform 300 to assist in identifying whether the node should be promoted to a cluster-head, and how high in the hierarchy it will be promoted. It should be noted that each level of the hierarchy operates independently to the higher level, and has no visibility or awareness to upper levels. Thus, promotion is specific to one level only.

Figure 4:
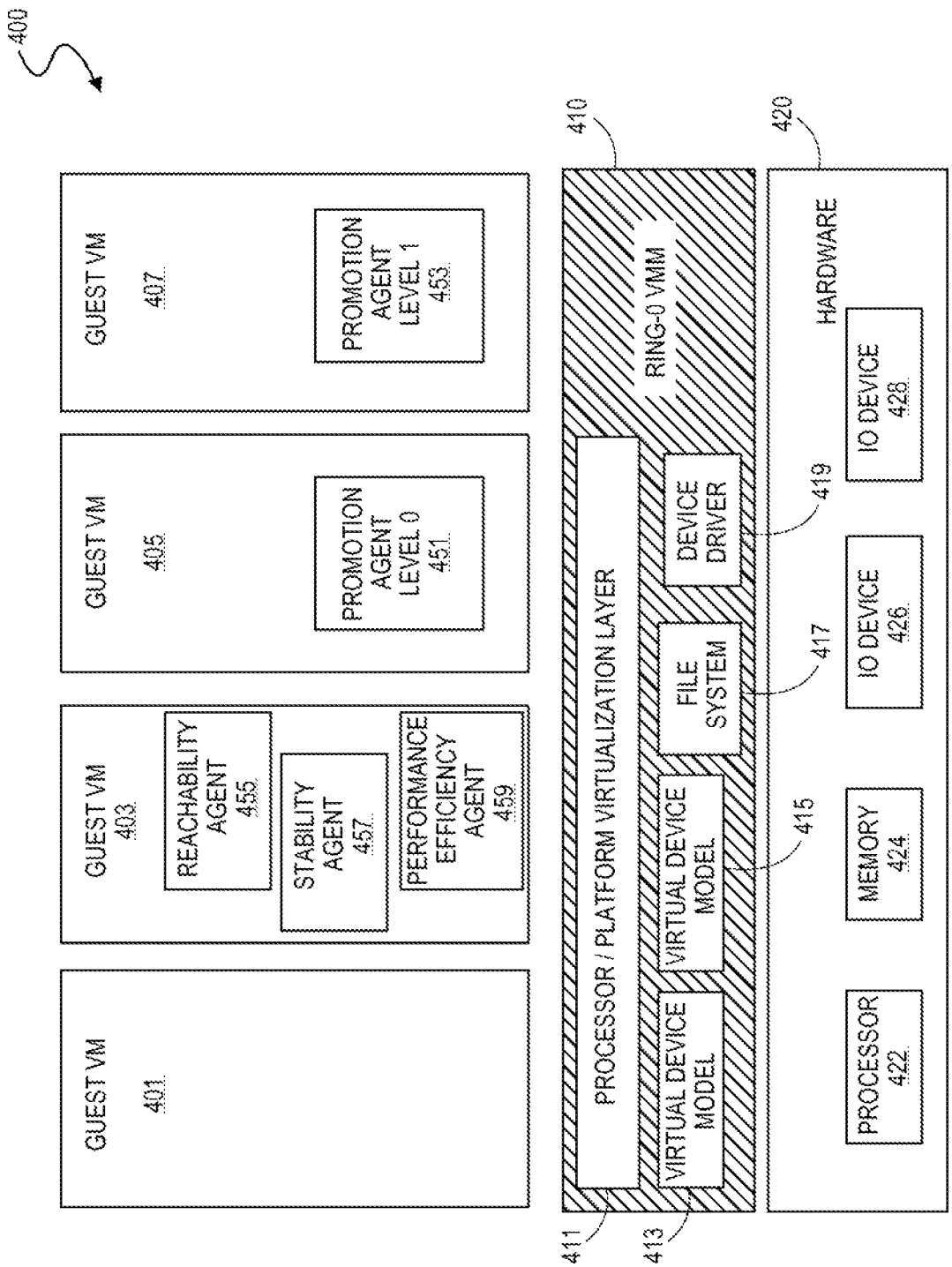
FIG. 4 is a block diagram of an exemplary node having virtualization technology (VT) architecture, according to an embodiment of the invention.

FIG. 4 is a block diagram of an exemplary node having virtualization technology (VT) architecture, according to an embodiment of the invention. FIG. 4 is a block diagram illustrating traditional hypervisor virtual machine monitor (VMM) architecture platform 400. A number of guest virtual machines (VMs) 401, 403, 405, and 407 may be running on the platform 400 at the same time. A VMM 410 controls the guest VMs' access to the hardware 420 via the processor/platform virtualization layer 411. A number of virtual device models 413 and 415 may exist within the VMM 410. The VMM 410 may operate at the highest privilege level. The VMM 410 controls access to the file system 417, memory and all devices, as discussed further below. The VMM 410 typically has a device driver 419 for each hardware device on the platform.

The VMM 410 and guest VMs 401, 403, 405 and 407 execute on platform hardware 420. The platform hardware 420 may include a processor 422, memory 424 and one or more I/O devices 426 and 428. The platform hardware 420 may be a personal computer (PC), mainframe, handheld device, portable computer, set top box, or any other computing system.

Processor 422 may be any type of processor capable of executing software, such as a microprocessor, digital signal processor, microcontroller, or the like. Though FIG. 4 shows only one such processor 422, there may be one or more processors in platform hardware 420 and one or more of the processors may include multiple threads, multiple cores, or the like.

Memory 424 may be a hard disk, a floppy disk, random access memory (RAM), read only memory (ROM), flash memory, or any other type of medium readable by processor 422. Memory 424 may store instructions for performing the execution of method embodiments of the present invention.

The one or more I/O devices 426 and 428 may be, for example, network interface cards, communication ports, video controllers, disk controllers on system buses (e.g., Peripheral Component Interconnect (PCI), Industry Standard Architecture (ISA), Advanced Graphics Port (AGP)), devices integrated into the chipset logic or processor (e.g., real-time clocks, programmable timers, performance counters), or any other device on the platform hardware 420. The one or more I/O devices 426 and 428 may be accessed through I/O instructions, or memory mapped I/O accesses or through any other means known in the art.

In an embodiment of the invention, a virtual machine (VM) in the platform 400 may execute network services to determine the (a) reachability, (b) stability and (c) performance efficiency of the platform 400 to assist in identifying whether the node should be promoted to a cluster-head, and how high in the hierarchy it will be promoted. In some embodiments, this VM may be a virtual appliance running at an elevated level of security, and in others it may be simply be running in a guest VM.

Figure 5:
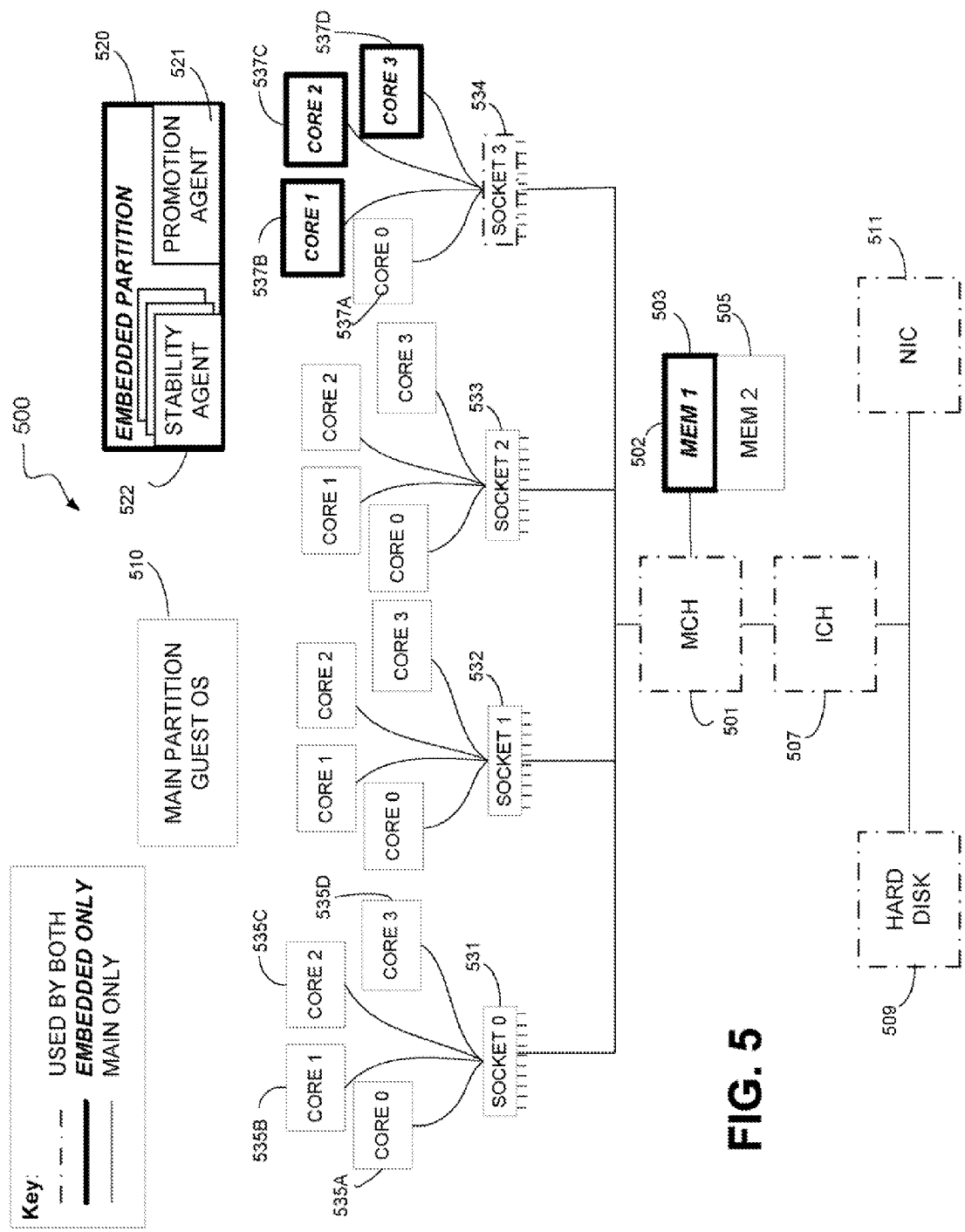
FIG. 5 is a block diagram of an exemplary node having platform resource layer (PRL), or embedded partition, architecture, according to an embodiment of the invention.

FIG. 5 is a block diagram of an exemplary node having platform resource layer (PRL), or embedded partition, architecture, according to an embodiment of the invention. In a platform resource layer (PRL) architecture, or embedded partition architecture, various components of the platform are enhanced to enable partitioning of processor, memory and other resources. Referring now to FIG. 5, there is shown an exemplary block diagram of a PRL architecture, according to embodiments of the invention. To better illustrate partitioning, components that are available to the main partition 510 are drawn with solid blocks. Components available to the embedded, or system partition 520, are drawn with bold, solid blocks. Components available to both partitions are drawn with a block alternating with dots and dashes.

In this exemplary embodiment, a platform, or node, has four multi-core processors in Sockets 0-3 (531-534). While this example shows only four processor sockets, it will be apparent to one of ordinary skill in the art that various configurations of processors and cores may be used to practice embodiments of the invention. For instance, Socket 0 (531) may have four processing cores 535a-d. In essence, in this example, the illustrated embodiment has 16 effective processors on the platform (e.g., four sockets with four cores in each socket). In this example, Sockets 0-2 (531-533) are available only to the main partition 510. Socket 3 (534) is available to both the main partition 510 and to the embedded partition 520. Within Socket 3 (534), core 0 is available only to the main partition 510, and cores 1-3 are available only to the embedded partition 520. The embedded partition 520 may have a promotion agent, or clustering manager, 521, as more fully discussed above and below. In an embodiment, the embedded partition may also comprise other agents or services, for instance, for determining reachability (not shown), stability 522 and performance efficiency (not shown). These services may be part of a same embedded partition, or be segregated into one or more separate partitions. For a node that is a member, or cluster-head or multiple virtual clusters, there may be multiple instances (not shown) of a promotion agent, or other services, running for each cluster of which the node is a member.

In this embodiment, the platform has a memory controller hub (MCH) 501 (also known as north bridge) coupled to memory 502. Memory 502 may have two partitions MEM1 (503) and MEM2 (505). Memory partition MEM1 (503) is available only to the embedded partition and memory partition MEM2 (505) is available only to the main partition. The chipset containing the MCH is configured to partition the memory using hardware constructs, in contrast to a VMM solution which uses software constructs. It will be understood that memory 502 may be a hard disk, a floppy disk, random access memory (RAM), read only memory (ROM), flash memory, or any other type of medium readable by processor. Memory 502 may store instructions for performing the execution of embodiments of the present invention. While only two partitions are shown in this example, it will be understood that there may be more than one guest OS, each running in its own partition.

The MCH 501 may communicate with an I/O controller hub (ICH) 507, also known as South bridge, via a peripheral component interconnect (PCI) bus. The ICH 507 may be coupled to one or more components such as PCI hard drives, legacy components such as IDE, USB, LAN and Audio, and a Super I/O (SIO) controller via a low pin count (LPC) bus (not shown). In this example, the ICH 507 is shown coupled to a hard disk drive 509 and to a network interface controller (NIC) 511.

The MCH 501 is configured to control accesses to memory and the ICH 507 is configured to control I/O accesses. In an embedded partition architecture, the chipset is configured by the firmware, upon boot, to partition the various resources on the platform. In some cases, there may be only one partition and the platform acts like a legacy platform in most respects. In the example shown, there are two partitions, a main partition 510 and an embedded partition 520. Each partition designated is given a unique partition identifier (ID).

With an embedded partition configuration, when a device sends an alert, the chipset may properly route the alert to the appropriate partition, as this information is encoded at boot time. In a VMM enabled system, the hardware passes the device alerts to the VMM (virtualized devices) and the software routes the information appropriately to the various virtual machines. An embedded partition may act as hardware assisted virtualization.

In an embodiment, a promotion agent may be embodied within a VMM which controls all guest virtual machines (VMs) and guest operating systems (OS's) running on the platform. In another embodiment, the promotion agent is embodied in a privileged partition, process or hypervisor that controls I/O requests for individual OS's. In all cases, the promotion agent measures activities and performance data to determine the (a) reachability, (b) stability and (c) performance efficiency of the platform 500. This determination allows the node 500 to self-promote or at least pass its metrics on to another node, perhaps a cluster head, to determine whether or not to promote node 500 to a higher cluster level.

Figure 6:
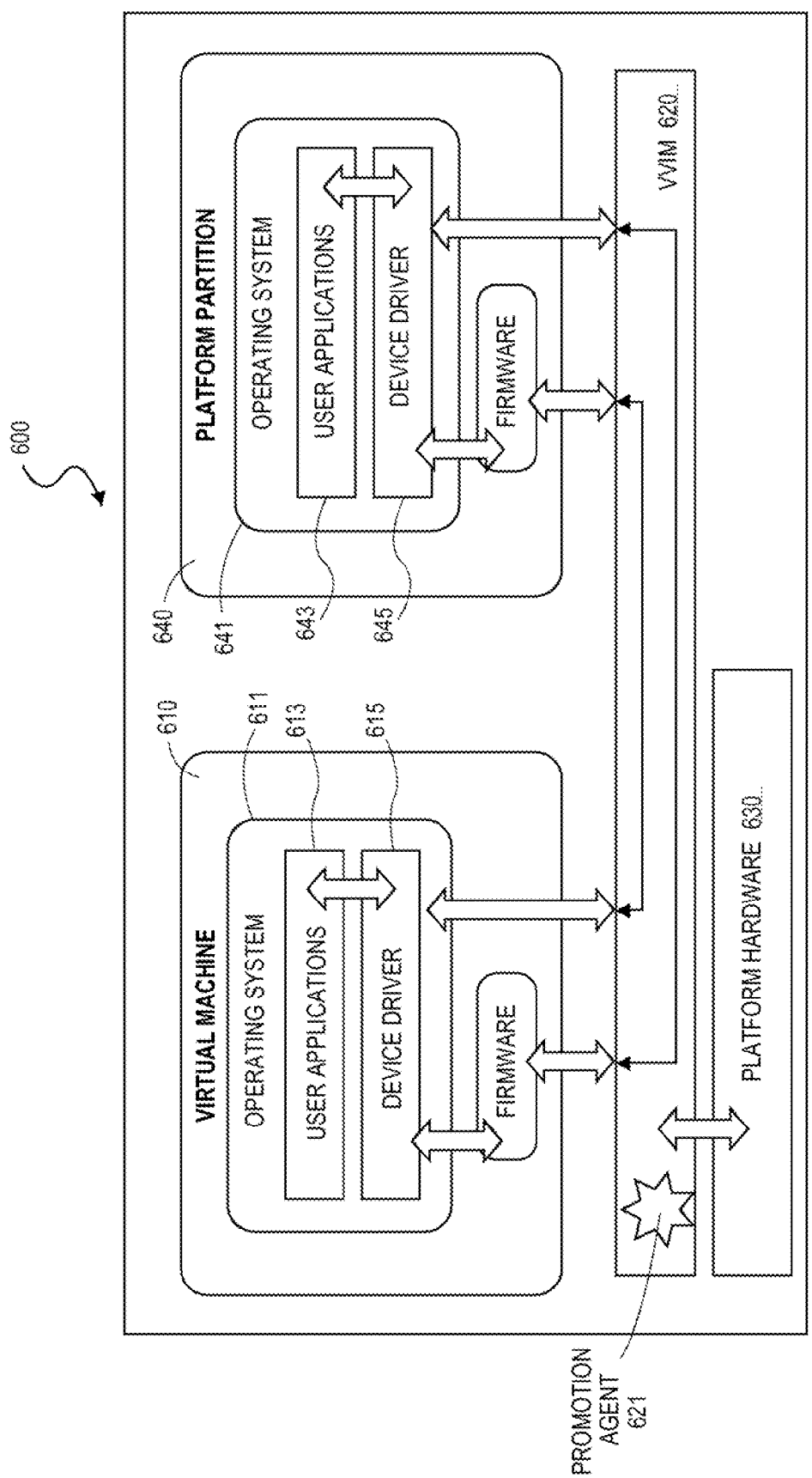
FIG. 6 is a block diagram of an exemplary virtualization platform where a promotion agent resides in a virtual machine monitor.

Referring now to FIG. 6, an exemplary virtualization platform where the promotion agent 621 resides in a VMM is shown. In this exemplary embodiment, a virtual machine (VM) 610 has a guest OS 611. Various user applications 613 may run under the guest OS 611. The OS has device drivers 615 which may be virtualized within the VMM 620. Access to platform hardware 630 will require the use of the VMM. In the case of hierarchical promotion in a cluster environment as discussed above, a promotion agent 621 within the VMM 620 may measure activities and performance data to determine the (a) reachability, (b) stability and (c) performance efficiency of the platform 600. This determination allows the node 600 to self-promote or at least pass its metrics on to another node, perhaps a cluster head, to determine whether or not to promote node 600 to a higher cluster level.

Similarly, a platform partition, or more privileged partition 640 having its own OS 641, user applications 643, device drivers 645 is shown. This platform partition may also have virtualized devices via the VMM 620.

In the illustrated embodiment, the VMM is shown to comprise a promotion agent. In other embodiments, the promotion agent may execute within a VM on the platform. The VMM or individual VMS may also comprise other agents or services, for instance, for determining reachability, stability and performance efficiency. These services may be part of a same VM, or be segregated into one or more separate VMs. For a node that is a member, or cluster-head or multiple virtual clusters, there may be multiple instances of a promotion agent, or other services, running for each cluster of which the node is a member.

In an embodiment, the reachability, stability and performance efficiency service may be part of the promotion agent, or separate services being used for a variety of management purposes. Referring again to FIG. 4, for instance, in a VMM embodiment, 400, a node may be part of clusters at both cluster level 0 and cluster level 1. A separate instance of a promotion agent may exist for each cluster level 451 and 453. In some embodiments, these instances may be run in different VMs, or partitions, 405 and 407. In other embodiments, multiple instances may run in the same VM, partition or VMM. The promotion agent may require the use of a specific service or agent to provide reachability 455, stability 457 and performance efficiency 459 data. These agents may run in a same partition or VM, or in the same partition or VM. In some embodiments, the services may be imbedded within the promotion agent, or other component requiring their services.

As illustrated in FIG. 4, a reachability agent 455, stability agent 457 and a performance efficiency agent 459 are shown as separate agents running in the same VM 403. It will be understood by those of skill in the art after reviewing the description herein, that various permutations and embodiments may be implemented, within the scope of the disclosed inventions. In an embodiment, a virtualization platform may have a virtual appliance, or secure VM or service operation system (SOS), and one or more capability operating systems (COS) or user environments. In these embodiments, the agents may all run in the same virtual appliance or (SOS).

Figure 7:
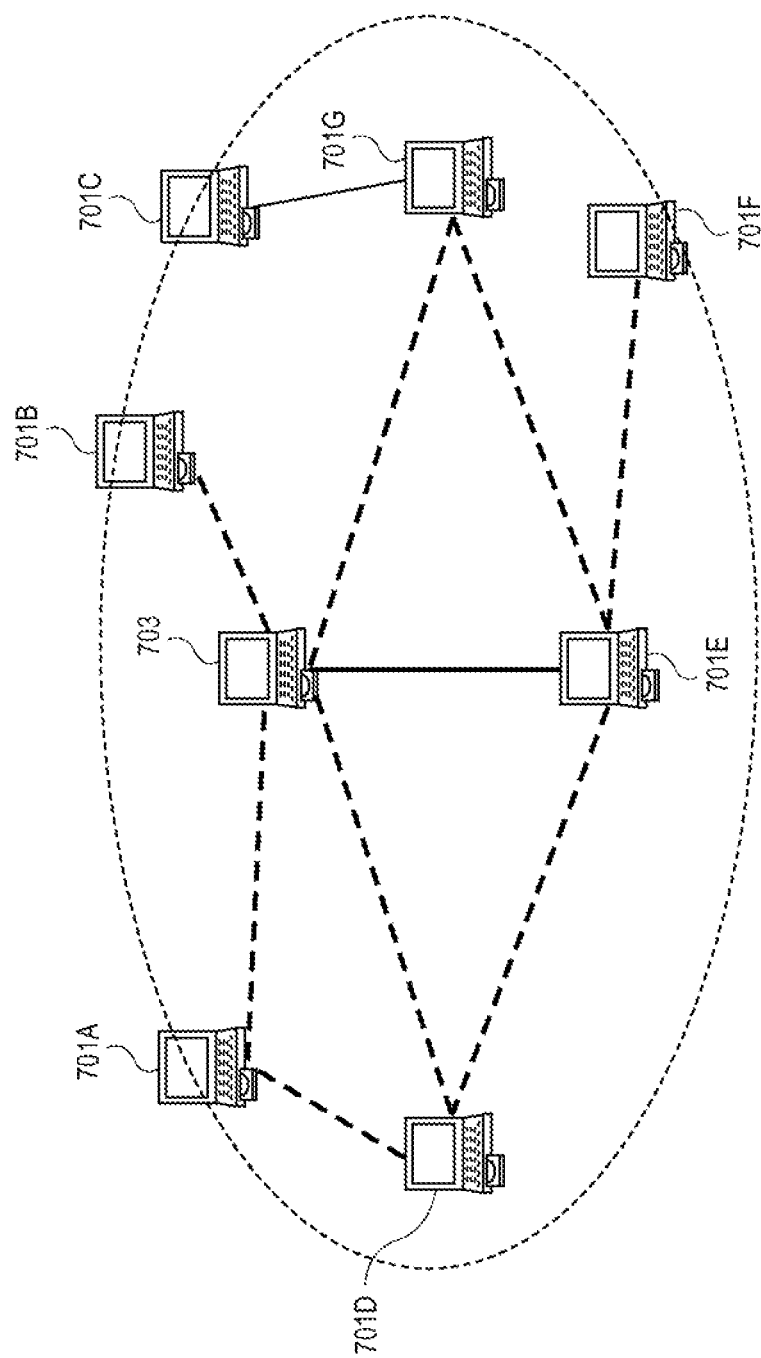
FIG. 7 is a diagram of a cluster hierarchy where the cluster's sub-network does not experience external influences to its topological configuration, according to embodiments of the invention.

Within the context of a clustering framework, as described above, stability may be accomplished in two ways. First, each cluster can reach a level of stability, independently, to the broader portions of the network, by ensuring a relatively uniform level of operational disparity with other nodes or cluster-heads within the same cluster by maintaining a static topology configuration and operational uniformity across the cluster during one or more measurement cycles. Alternatively, external node dynamics can reduce the level of instability, either through the reduction (departure) of unstable nodes or increase (arrival) of more stable nodes, relative to the other nodes or cluster-heads within the same cluster. Thus, it is essential that the entropy formulations consider both dynamics—imitating the equalization and dissipation behaviors of both isolated (intra-cluster) systems and open systems (inter-cluster) in thermodynamic systems, respectively. FIGS. 7 and 8 depict these influences.

Referring now to FIG. 7, there is shown a cluster hierarchy where the cluster's sub-network does not experience external influences to its topological configuration. In this embodiment, node 703 is a cluster-head and nodes 701*a-g* are subordinate nodes within the cluster. This cluster is fairly static, with no migration of nodes in or out of the cluster. FIG. 8 depicts a cluster hierarchy where OverMesh nodes are entering the environment (801, 803, 805, 807), represented by double cross-hatched nodes, and departing the environment (811, 813), represented by a single cross-hatched node. In both cases, the cluster's aggregate entropy can reflect a level of equilibrium and nodes of equilibrium based on their relative measures of statistical availability or reliability between the nodes.

To characterize a cluster's stability or entropy, the key measures of interest are the relative availability or reliability between cluster nodes. The general term "dependability" is used to describe this in the discussion that follows. Several measures may be used either independently or in combination to represent the relative dependability between cluster nodes, or node-node service dependability.

TABLE 1

Service Dependability
Service Dependability Influences

| Stability Constraint | High fading conditions | Excessive load or congestion | Component failures | Battery limitations | Range |
|---|---|---|---|---|---|
| Δ Metric | Loss rate | Utilization | Availability | Power level | Distance (signal strength) |

As shown in Table 1, service dependability may have multiple stability or environmental constraints with local node and link impact, but more importantly on applications and network services that traverse multiple OverMesh nodes. From the standpoint of the self-organizing cluster, characterizing the level of dynamics or stability across the cluster is of concern, given such constraints. Therefore, one can use a combined metric to characterize the degree of service dependability between nodes, or choose to be selective to the most critical constraint (e.g., node availability) in characterizing cluster stability or entropy.

Table 1 is an example of constraints of concern, but is not exhaustive. For instance, a constraint of stability may be a high fading condition. Once measure of this condition is a loss rate, but there may be others. A measure of excessive load or congestion may be utilization, but other measures may be available, etc.

In formulating cluster entropy, a period between $t_1$ and $t_2$ of $\Delta T$, and $D_{m,n}(\Delta T)$ is defined for an entropy period, as the average relative dependability of node m with respect to node n at time $t_2$, where m and n are both members of the same cluster $C_{i,j}$, and with the nodes exchanging relative dependability samples, $d_{m,n}(\Delta \tau)$ during multiple $\Delta \tau$ intervals within the entropy period, $\Delta T$. It should be noted that the actual dependability metric and measurement units is irrelevant, since only the relative dependability differences between the nodes is important. More specifically, both measures are defined below with the goal of eventually defining an entropy formulation for cluster, $C_{i,j}$.

The sample relative dependability at node m with respect to node n during interval $\Delta t$ is defined as:

$$d_{m,n}(\Delta \tau) = d_m(\Delta \tau) - d_n(\Delta \tau) \quad \text{(eq. 1)}$$

Figure 9:
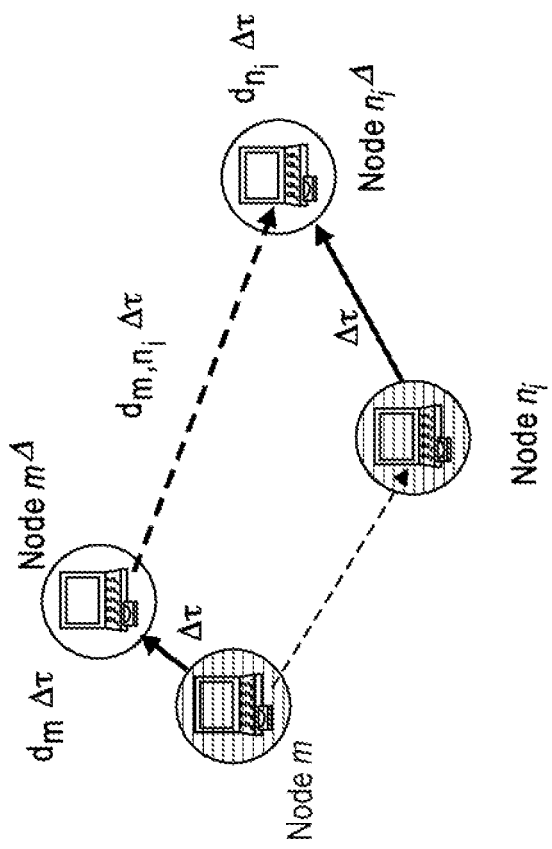
FIG. 9 shows a sample of relative dependency at a node, according to embodiments of the invention.

The node changes are depicted in FIG. 9, where the change $\Delta \tau$ reflects the interval of change, and a relative change in the service dependability are reflected for both node m and node n during the interval.

The absolute relative dependability between node m and node n averaged over the period $\Delta T$ is defined as:

$$D_{m,n}(\Delta T) = \frac{1}{N} \sum_{i=1}^{N} |d_{m,n}(t_i)| \quad \text{(eq. 2)}$$

where N is equal to the number of samples in $\Delta T$ and $t_1$ is the discrete time at the end of each sample, $\Delta \tau$.

Figure 10:
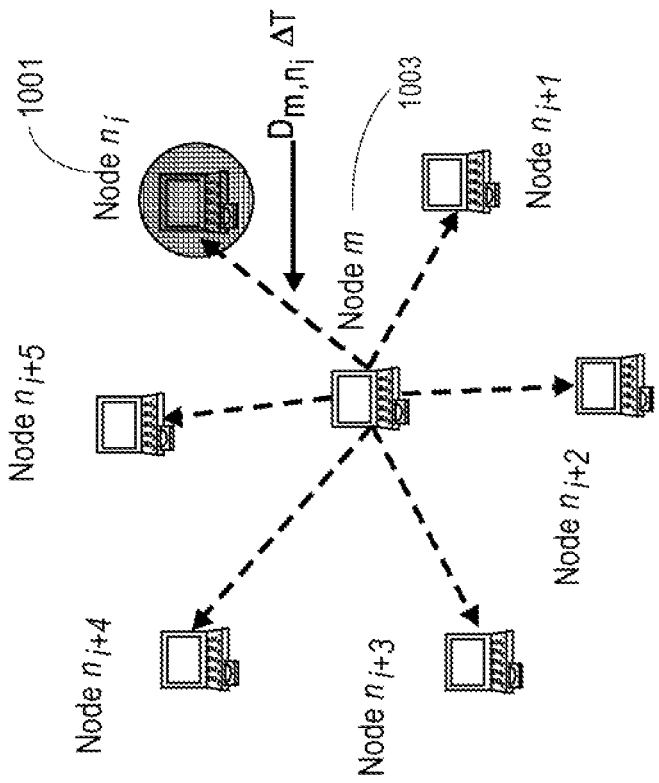
FIG. 10 shows node dependability relationships according to embodiments of the invention.

This is depicted also in FIG. 10, where the particular node of interest $n_i$ (1001) is highlighted depicting only a single node-to-node dependability relationship over the period of entropy evaluation. However, the same measures for the other nodes belonging to the cluster, $C_{ij}$, are also exchanged and evaluated with respect to node $m_i$ (1003). The complete (absolute relative) dependability representations for the other nodes in $C_{ij}$ should account for the event space about node $m_i$.

Now, to characterize stability, a generalized form of Shannon's statistical entropy applied to an event space may be used, specifically:

$$H = -\Sigma_j p_i * \log p_i. \quad \text{(eq. 3)}$$

where $p_i$ is the probability of the event $e_i$ in the event space E. More information about Shannon's information theory may be found from a variety of sources, including on the public Internet at URL en*wikipedia*org/wiki/Information_theory. Periods have been replaced with asterisks in URLs in this document to prevent inadvertent hyperlinks. Applying this concept to a dependability event space for node m, sets $$p_k(t, \Delta T) = D_{m,k} / \Sigma_x D_{m,x}, \quad \text{(eq. 4)}$$

where x is evaluated over all peer nodes of node m in the cluster, $C_{ij}$, and thus:

$$H_m(t, \Delta T) = -[\Sigma_k p_k(t, \Delta T) \log p_k(t, \Delta T)] / [\log C(C_{ij})], \quad \text{(eq. 5)}$$

where $C(C_{ij})$ is the cardinality of the cluster.

In general, $H_m(t, \Delta T)$ is calculated as the entropy of node m during the specific period of entropy measurement $\Delta T$ in cluster $C_{ij}$, normalized between [0,1]. This representation of entropy is the desired measure of stability with respect to node m, in terms of the absolute relative dependability during the period of stability state evaluation, $\Delta T$. As defined, entropy is small when the change in relative dependability variation shows higher perturbation, while a higher entropy value will show more relative stability.

Finally, having calculated the entropy for a single node in the cluster, the entropy terms for the other nodes in cluster $C_{ij}$, may be evaluated, similarly. To assess a measurement for the cluster's overall stability, term gamma, $\gamma$, is defined and captured by the cluster-head associated to $C_{ij}$:

$$\gamma = [H_{CH}(t, \Delta T)] * \min[H_i(t, \Delta T)], \quad \text{(eq. 6)}$$

where CH is the cluster-head for $C_{ij}$ and i=(all nodes in Cij\CH).

It should be noted that the formulas/equations described above correspond to exemplary embodiments and should not be seen as limiting. Similar or related entropy formulas may be applied in other embodiments in accordance with the disclosed and illustrated principles.

Current network management systems are highly dependent on user administration and human controls. In dynamic mesh networks, there is little commercial availability, today, of self-organizing systems, and certainly none that are applying entropy-based techniques to manage stability state. Moreover, in emerging countries, requiring human control and administration is ineffective because information technology (IT) tools and operations are often scarce. Thus, utilizing a self-organizing network that utilizes an automatic entropy-based stability management engine is advantageous.

A service that provides stability measurement, as described above may also be used to support routing applications. This stability between clusters may be used to achieve a level of optimization not possible with existing systems. The stability service may be used to support any number of management functions. Being able to view a network from a topological view and determine areas where there is more chaos enables management to avoid chaotic areas (unstable areas) of the network. The system may then perturb traffic to be routed through more stable nodes and achieve a better balance or achieve performance objectives.

In another embodiment the service, or operational agent, uses the stability measurements to support fault management systems, security systems, network-wide management and control functions, and other operational and organizational features of a complex system, or network. It will be understood by those of skill in the art after reading the disclosure herein, often services other than the stability service or agent, are to be used in conjunction with the stability factors to provide the management and control functions. For instance, in the network hierarchy described above, there may also be independent services to provide reachability and performance values.

TABLE 2

Use of Services in Optimizing Various Networks and Activities

| Network Management & Control Objective | Reachability | Stability | Performance | Stability measurement scope |
|---|---|---|---|---|
| Routing | X | X | | Mobility fluctuations multi-hop interference variability |
| Load balancing | | X | | Mobility fluctuations or multi-hop interference variability |
| Root-cause analysis | | X | | Node or link reliability of fault management agent employment on node |
| Service discovery | X | | | |
| Path availability | X | X | | Mobility fluctuations or multi-hop interference variability |
| Service processing | | X | X | Node or link reliability to service |
| SLA management | | | X | |

Table 2 illustrates the use of reachability, stability and performance services for use in network management and control. Combining one or more of multiple measures, e.g. stability, reachability, performance, etc., may be used to optimize the network, in distributed fashion. For instance, the most effective Service Processing depends and is optimized by using stability and performance measures, i.e., how reliable (stability) the node is and how "fast" (performance) the node processes a service request. The first column of Table 2 is the general application, or objective, of the network. The next three columns indicate which factors may be used to optimize the network based on the objective, or which factors are relevant. The last column shows a measurement of the stability in each application. In other words, the last column is specific to characteristics of a wireless mesh network that may be 'measured' and then utilized in conjunction with the 'entropy' framework to assess stability, as described above. For instance, in some embodiments for routing applications, only the reachability and stability measurements are used to optimize the network, but not the performance service.

The techniques described herein are not limited to any particular hardware or software configuration; they may find applicability in any computing, consumer electronics, or processing environment. The techniques may be implemented in hardware, software, or a combination of the two.

For simulations, program code may represent hardware using a hardware description language or another functional description language which essentially provides a model of how designed hardware is expected to perform. Program code may be assembly or machine language, or data that may be compiled and/or interpreted. Furthermore, it is common in the art to speak of software, in one form or another as taking an action or causing a result. Such expressions are merely a shorthand way of stating execution of program code by a processing system which causes a processor to perform an action or produce a result.

Each program may be implemented in a high level procedural or object-oriented programming language to communicate with a processing system. However, programs may be implemented in assembly or machine language, if desired. In any case, the language may be compiled or interpreted.

Program instructions may be used to cause a general-purpose or special-purpose processing system that is programmed with the instructions to perform the operations described herein. Alternatively, the operations may be performed by specific hardware components that contain hardwired logic for performing the operations, or by any combination of programmed computer components and custom hardware components. The methods described herein may be provided as a computer program product that may include a machine accessible medium having stored thereon instructions that may be used to program a processing system or other electronic device to perform the methods.

Program code, or instructions, may be stored in, for example, volatile and/or non-volatile memory, such as storage devices and/or an associated machine readable or machine accessible medium including solid-state memory, hard-drives, floppy-disks, optical storage, tapes, flash memory, memory sticks, digital video disks, digital versatile discs (DVDs), etc., as well as more exotic mediums such as machine-accessible biological state preserving storage. A machine readable medium may include any mechanism for storing, transmitting, or receiving information in a form readable by a machine, and the medium may include a tangible medium through which electrical, optical, acoustical or other form of propagated signals or carrier wave encoding the program code may pass, such as antennas, optical fibers, communications interfaces, etc. Program code may be transmitted in the form of packets, serial data, parallel data, propagated signals, etc., and may be used in a compressed or encrypted format.

Program code may be implemented in programs executing on programmable machines such as mobile or stationary computers, personal digital assistants, set top boxes, cellular telephones and pagers, consumer electronics devices (including DVD players, personal video recorders, personal video players, satellite receivers, stereo receivers, cable TV receivers), and other electronic devices, each including a processor, volatile and/or non-volatile memory readable by the processor, at least one input device and/or one or more output devices. Program code may be applied to the data entered using the input device to perform the described embodiments and to generate output information. The output information may be applied to one or more output devices. One of ordinary skill in the art may appreciate that embodiments of the disclosed subject matter can be practiced with various computer system configurations, including multiprocessor or multiple-core processor systems, minicomputers, mainframe computers, as well as pervasive or miniature computers or processors that may be embedded into virtually any device. Embodiments of the disclosed subject matter can also be practiced in distributed computing environments where tasks or portions thereof may be performed by remote processing devices that are linked through a communications network.

Although operations may be described as a sequential process, some of the operations may in fact be performed in parallel, concurrently, and/or in a distributed environment, and with program code stored locally and/or remotely for access by single or multi-processor machines. In addition, in some embodiments the order of operations may be rearranged without departing from the spirit of the disclosed subject matter. Program code may be used by or in conjunction with embedded controllers.

While this invention has been described with reference to illustrative embodiments, this description is not intended to be construed in a limiting sense. Various modifications of the illustrative embodiments, as well as other embodiments of the invention, which are apparent to persons skilled in the art to which the invention pertains are deemed to lie within the spirit and scope of the invention.

What is claimed is:

1. A system for entropy-based stability management, comprising:
    a hardware processor in a hierarchical network executing a stability agent;
    a plurality of computing nodes in a network, each node comprising;
        logic comprising an operational agent for autonomous self-promotion and demotion in the network, wherein a promoted node rises to a cluster level above a previous cluster level and becomes part of a virtual cluster at the level above, while remaining in a virtual cluster of the previous level, and wherein a demoted node falls to a cluster level below the previous cluster level and no longer remains in the virtual cluster at the higher level;
        logic to provide management and control service functions to cluster k peer nodes in a node that has been promoted to a cluster-head of the cluster k;
        logic to provide management and control service functions to other nodes in cluster levels below a current cluster level of the node from which the node has been promoted,
        wherein the operational agent for autonomous self-promotion and demotion in the network uses information based on a node's behavior relating to (a) reachability, (b) stability and (c) performance efficiency, and wherein the stability behavior is generated by the stability agent,
    the stability agent to collect stability information from the plurality of nodes on the network and to determine a relative dependability between and among the plurality of nodes, and to calculate a level of stability of each of the plurality of nodes on the network, wherein the level of stability is calculated using entropy-based statistical methods; and
    the operational agent running on at least one node on the network, the operational agent to receive the stability information from the stability agent and to provide management and control operations to at least one aspect of the network, based on the stability information;
    wherein the cluster-head of cluster k has no direct visibility of any cluster in a layer directly above cluster k and the cluster-head of cluster k, but no peer node in cluster k, can directly participate in direct inter-cluster communications.

2. The system as recited by claim 1, wherein Shannon's Laws of statistical entropy equations are to be applied to each node in a cluster of nodes on the network, in part, using an entropy of node m during the specific period of entropy measurement $\Delta T$ in the cluster $C_{ij}$, normalized between [0, 1], to result in a desired measure of stability with respect to node m, in terms of an absolute relative dependability during the period of stability state evaluation, and where measurement of the cluster's overall stability, $\gamma$, is defined and captured by a cluster-head associated to $C_{ij}$ as:

$$\gamma = [H_{CH}(t, \Delta T)] * \min [H_i(t, \Delta T)],$$

where CH is the cluster-head for $C_{ij}$ and i =(all nodes in Cij\CH), wherein $H_{CH}(t, \Delta T)$ represents entropy of node m during the period of measurement; where node m is cluster-head CH, and where function "min" is a minimum entropy of all other nodes in the cluster $C_{ij}$.

3. The system as recited in claim 1, wherein the operational agent is to provide management and control of a self-managing network of virtual clusters and where the stability information is to be used with reachability and performance efficiency factors of nodes in the network to enable a determination to be made for promotion and demotion of nodes in the network.

4. The system as recited in claim 1 wherein the management and control operation comprises one or more of routing control, security management and fault management.

5. A system for entropy-based stability management, comprising:
    a hardware processor in a hierarchical network executing a stability agent;
    a plurality of computing nodes in a network, each node comprising;
        logic comprising an operational agent for autonomous self-promotion and demotion in the network, wherein a promoted node rises to a cluster level above a previous cluster level and becomes part of a virtual cluster at the level above, while remaining in a virtual cluster of the previous level, and wherein a demoted node falls to a cluster level below the previous cluster level and no longer remains in the virtual cluster at the higher level;
        logic to provide management and control service functions to cluster k peer nodes in a node that has been promoted to a cluster-head of the cluster k;
        logic to provide management and control service functions to other nodes in cluster levels below a current cluster level of the node from which the node has been promoted,
        wherein the operational agent for autonomous self-promotion and demotion in the network uses information based on a node's behavior relating to (a) reachability, (b) stability and (c) performance efficiency, and wherein the stability behavior is generated by the stability agent, the stability agent to collect stability information from the plurality of nodes on the network and to determine a relative dependability between and among the plurality of nodes, and to calculate a level of stability of each of the plurality of nodes on the network, wherein the level of stability is calculated using entropy-based statistical methods; and the operational agent running on at least one node on the network, the operational agent to receive the stability information from the stability agent and to provide management and control operations to at least one aspect of the network, based on the stability information;

wherein the cluster-head of cluster k has no direct visibility of any cluster in a layer directly above cluster k and the stability agent executes in one of an embedded partition, virtual machine monitor, virtual appliance, and virtual machine in the processor.

6. The system as recited in claim 5, wherein a reachability agent providing reachability behavior information executes in one or more of an embedded partition, virtual machine monitor, virtual appliance, virtual machine in at least one of the computing nodes on the network, and a performance efficiency agent providing performance efficiency behavior information executes in one or more of an embedded partition, virtual machine monitor, virtual appliance, virtual machine in at least one of the computing nodes on the network, and wherein the reachability agent, performance efficiency agent and stability agent run on either a same or different node, or combination thereof, on the network.

7. A method for entropy-based stability management in a hierarchical network having a plurality of nodes, comprising:

autonomously determining, by a node, whether the node should be autonomously promoted, autonomously demoted or stay at a same level in the network hierarchy, the promotion and demotion of the node is to a current cluster level from a previous cluster level, wherein a promoted node rises to a cluster level above the previous cluster level and becomes part of a virtual cluster at the level above, while remaining in a virtual cluster of the previous level, and wherein a demoted node falls to a cluster level below the previous cluster level and no longer remains in the virtual cluster at the higher level, wherein information used to enable self-promotion and demotion of the node from the previous cluster is based on collected states, and the information is distributed among nodes in the hierarchical network residing with nodes having a relationship to the previous cluster and wherein the information is not guaranteed to be held by anyone node in the hierarchical network, and wherein membership of the node in a cluster is irrelevant to a physical network model except when related to the node's behavior regarding reachability, stability and performance efficiency, and wherein there is no prohibition or rule against a cluster having only one member or having as many clusters as there are nodes in the network, and wherein cluster membership is based on self-promotion and demotion;

collecting stability information from a plurality of nodes on a hierarchical network, by a stability agent;

determining a relative dependability between and among the plurality of nodes on the network based on the collected stability information, by the stability agent;

calculating, by the stability agent, a level of stability of each of the plurality of nodes on the network, wherein the level of stability is calculated using entropy-based statistical methods; and providing, by the stability agent, the level of stability information to an operational agent for management and control operations, the operational agent running on a node on the network;

wherein a cluster-head of cluster k has no direct visibility of any cluster in a layer directly above cluster k and the stability agent executes in one of an embedded partition, virtual machine monitor, virtual appliance, and virtual machine in the processor.

8. The method as recited by claim 7, wherein Shannon's Laws of statistical entropy equations are to be applied to each node in a cluster of nodes on the network, in part, using an entropy of node m during the specific period of entropy measurement $\Delta T$ in the cluster $C_{ij}$, normalized between [0,1], to result in a desired measure of stability with respect to node m, in terms of an absolute relative dependability during the period of stability state evaluation, and where measurement of the cluster's overall average stability, $\gamma$, is defined and captured by a cluster-head associated to $C_{ij}$ as:

$\gamma = [H_{CH}(t, \Delta T)] * \min [H_i(t, \Delta T)]$, where CH is the cluster-head for $C_{ij}$ and $I = $(all nodes in $C_{ij}\setminus$CH), wherein $H_{CH}(t, \Delta T)$ represents entropy of node m during the period of measurement, where node m is cluster-head CH, and where function "min" finds a minimum entropy of all other nodes in the cluster $C_{ij}$.

9. The method as recited in claim 7, further comprising:

providing management and control of a self-managing network of virtual clusters, by the operational agent, where the stability information is to be used with reachability and performance efficiency factors of nodes in the network to enable a determination to be made for promotion and demotion of nodes in the network.

10. The method as recited in claim 7, wherein the management and control operations comprises routing control.

11. The method as recited in claim 7, further comprising:

determining by the operational agent executing on a node on the network whether the node is to be promoted, demoted or stay at a same level, wherein a promoted node rises to a cluster level above a previous cluster level and becomes part of a virtual cluster at the level above, while remaining in a virtual cluster of the previous level, and wherein a demoted node falls to a cluster level below the previous cluster level and no longer remains in the virtual cluster at the higher level; and performing one of a promotion, demotion, or static operation based on results of the determining.

12. The method as recited in claim 11, further comprising:

providing management and control service functions to cluster k peer nodes in a node that has been promoted to the cluster-head of the cluster k;

providing management and control service functions to other nodes in cluster levels below a current cluster level of the node from which the node has been promoted, wherein the operational agent uses information based on a node's behavior relating to (a) reachability, (b) stability and (c) performance efficiency, and wherein the stability behavior is provided in the providing of the level of stability information.

13. The method as recited in claim 7, wherein the stability agent executes in one of an embedded partition, virtual machine monitor, virtual appliance, or virtual machine in a node on the network.

14. The method as recited in claim 13, further comprising:
providing reachability behavior information, by a reachability agent executing in one or more of an embedded partition, virtual machine monitor, virtual appliance, or virtual machine in at least one of the nodes on the network, and
providing performance efficiency behavior information by a performance efficiency agent executing in one or more of an embedded partition, virtual machine monitor, virtual appliance, or virtual machine in at least one of the nodes on the network,
wherein the reachability agent, performance efficiency agent and stability agent run on either a same or different node, or combination thereof, on the network.

15. A non-transitory machine readable storage medium having instructions for entropy-based stability management in a hierarchical network having a plurality of nodes, the instructions stored therein, that when the instructions are executed on a machine, cause the machine to:
autonomously determine, by a node, whether the node should be promoted, demoted or stay at a same level in the network hierarchy, the promotion and demotion of the node is to a current cluster level from a previous cluster level, wherein a promoted node rises to a cluster level above a the previous cluster level and becomes part of a virtual cluster at the level above, while remaining in a virtual cluster of the previous level, and wherein a demoted node falls to a cluster level below the previous cluster level and no longer remains in the virtual cluster at the higher level,
wherein information used to enable self-promotion and demotion of the node from the previous cluster is based on collected states, and the information is distributed among nodes in the hierarchical network residing with nodes having a relationship to the previous cluster and wherein the information is not guaranteed to be held by anyone node in the hierarchical network, and wherein membership of the node in a cluster is irrelevant to a physical network model except when related to the node's behavior regarding reachability, stability and performance efficiency, and
wherein there is no prohibition or rule against a cluster having only one member or having as many clusters as there are nodes in the network, and wherein cluster membership is based on self-promotion and demotion;
collect stability information from a plurality of nodes on a network, by a stability agent;
determine a relative dependability between and among the plurality of nodes on the network based on the collected stability information, by the stability agent;
calculate, by the stability agent, a level of stability of each of the plurality of nodes on the network, wherein the level of stability is calculated using entropy-based statistical methods; and
provide, by the stability agent, the level of stability information to an operational agent for management and control operations, the operational agent running on a node on the network
wherein a cluster-head of cluster k has no direct visibility of any cluster in a layer directly above cluster k and the cluster-head of cluster k, but no peer node in cluster k, can directly participate in direct inter-cluster communications.

16. The medium as recited in claim 15, wherein the entropy-based statistical methods are derived from Shannon's Laws of statistical entropy equations.

17. The medium as recited by claim 16, wherein the Shannon's Laws of statistical entropy equations are to be applied to each node in a cluster of nodes on the network, in part, using an entropy of node m during the specific period of entropy measurement $\Delta T$ in the cluster $C_{ij}$, normalized between [0,1], to result in a desired measure of stability with respect to node m, in terms of an absolute relative dependability during the period of stability state evaluation, and where measurement of the cluster's overall stability, $\gamma$, is defined and captured by a cluster-head associated to $C_{ij}$ as:
$\gamma=[H_{CH}(t,\Delta T)]*\min[H_i(t,\Delta T)]$, where CH is the cluster-head for $C_{ij}$ and I =(all nodes in $C_{ij}$\CH), wherein $H_{CH}(t, \Delta T)$ represents entropy of node m during the period of measurement, where node m is cluster-head CH and where function "min" finds a minimum entropy of all other nodes in the cluster $C_{ij}$.

18. The medium as recited in claim 15, further comprising instructions to:
provide management and control of a self-managing network of virtual clusters, by the operational agent, where the stability information is to be used with reachability and performance efficiency factors of nodes in the network to enable a determination to be made for promotion and demotion of nodes in the network.

19. The medium as recited in claim 15, further comprising instructions to:
determine by the operational agent executing on a node on the network whether the node is to be promoted, demoted or stay at a same level, wherein a promoted node rises to a cluster level above a previous cluster level and becomes part of a virtual cluster at the level above, while remaining in a virtual cluster of the previous level, and wherein a demoted node falls to a cluster level below the previous cluster level and no longer remains in the virtual cluster at the higher level; and
perform one of a promotion, demotion, or static operation based on results of the determining.

20. The medium as recited in claim 19, further comprising instructions to:
provide management and control service functions to cluster k peer nodes in a node that has been promoted to the cluster-head of the cluster k;
provide management and control service functions to other nodes in cluster levels below a current cluster level of the node from which the node has been promoted,
wherein the operational agent uses information based on a node's behavior relating to (a) reachability, (b) stability and (c) performance efficiency, and wherein the stability behavior is provided in the providing of the level of stability information.

21. The medium as recited in claim 15, wherein the stability agent executes in one of an embedded partition, virtual machine monitor, virtual appliance, or virtual machine in a node on the network.

22. The system as recited in claim 1, wherein the plurality of computing nodes further comprises logic to rank the reachability of other nodes in the hierarchical network.

23. The system as recited in claim 1, wherein the logic for autonomous self-promotion and demotion in the network is configured to weight the node's behavior relating to each of (a) reachability, (b) stability and (c) performance efficiency to rank the node for promotion or demotion, and where the weights are pre-determined based on a function of the network.

24. The medium as recited in claim 15, wherein autonomously determining whether the node should be promoted, demoted or stay at the same level further compromises instructions to weight the node's behavior relating to each of (a) reachability, (b) stability and (c) performance efficiency to rank the node for promotion or demotion, and where the weights are pre-determined based on a function of the network.

25. The system of claim 1, wherein the stability agent is to (a) determine an overall stability for cluster k, and (b) initiate the formation of another cluster based on the determined overall stability for cluster k.

26. The system of claim 1, wherein the promoted node has no direct knowledge of a cluster above the promoted node's present cluster level.

27. The system of claim 5, wherein the cluster-head of cluster k, but no peer node in cluster k, can directly participate in direct inter-cluster communications.

* * * * *